United States Patent [19]

Goutille

[11] Patent Number: 4,506,798
[45] Date of Patent: Mar. 26, 1985

[54] CONTAINER

[75] Inventor: Maurice Goutille, Lamorlaye, France

[73] Assignee: SCC Six-In-One Containers Co., S.A., Geneva, Switzerland

[21] Appl. No.: 476,870

[22] PCT Filed: Jul. 9, 1982

[86] PCT No.: PCT/CH82/00086

§ 371 Date: Mar. 16, 1983

§ 102(e) Date: Mar. 16, 1983

[87] PCT Pub. No.: WO83/00317

PCT Pub. Date: Feb. 3, 1983

[30] Foreign Application Priority Data

Jul. 20, 1981 [FR] France .................... 81 14107

[51] Int. Cl.³ ............................................. B65D 87/00
[52] U.S. Cl. .................................... 220/1.5; 220/4 F; 220/6
[58] Field of Search ............ 220/1.5, 4 F, 6, 4

[56] References Cited

U.S. PATENT DOCUMENTS

| | | | |
|---|---|---|---|
| 3,040,925 | 6/1962 | Mills | 220/1.5 |
| 3,401,814 | 9/1968 | Chiswell et al. | 220/1.5 X |
| 3,403,806 | 10/1968 | Pohl | 220/6 |
| 3,481,503 | 12/1969 | Kloess et al. | 220/1.5 |
| 3,602,388 | 8/1971 | Hurkamp | 220/6 X |
| 3,684,122 | 8/1972 | Bonomi | 220/1.5 |

FOREIGN PATENT DOCUMENTS

| | | |
|---|---|---|
| 29113 | 11/1971 | Australia . |
| 2132772 | 2/1972 | Fed. Rep. of Germany ....... 220/1.5 |
| 981393 | 5/1951 | France . |
| 1394873 | 7/1965 | France . |
| 1593377 | 7/1970 | France . |
| 2101331 | 3/1972 | France . |
| 2308556 | 4/1976 | France . |
| 476622 | 11/1969 | Switzerland . |
| 671350 | 4/1952 | United Kingdom . |
| 1171654 | 11/1969 | United Kingdom . |
| 1274300 | 5/1972 | United Kingdom . |
| 2039850 | 10/1980 | United Kingdom . |

Primary Examiner—Steven M. Pollard
Attorney, Agent, or Firm—Pennie & Edmonds

[57] ABSTRACT

The container comprising a base (1), two side panels (2,3), one front panel (4), one back side which opens (5) and a roof (6) can be assembled from and dismounted into the above listed components. Means are provided (18–21, 25a, 27a) for fastening the side panels (2,3) and the front panel (4) to the base (1) and to the roof (6). The three panels are provided with vertical reinforcements (7, 8, 9, 10). Means are provided (25, 27) for fastening the front panel (4) to the side panels (2, 3) by the abutting reinforcements (7–10). The back side (5) of the container consists of two doors (36, 37) which are hinged on the abutting reinforcements (7, 9). The fastening device (18–21) which holds the side panels together with the base and the roof can also be used to fasten the roof directly to the base when the container is dismounted; there is enough room between the roof and the base to store the side panels (2,3), the front panel (4) and the doors (36, 37).

The bulk of the container is considerably reduced when the container is dismounted and its components packed together, which in turn considerably reduces the cost of returning the empty containers; the container does not have any small components likely to be lost when it is returned; the container is very simple to assemble and to dismount; the fastening devices (18–21, 25a, 27a) are easy to operate; the bulk of the dismounted container with its components packed together is preferably equal to one sixth of the original container.

11 Claims, 13 Drawing Figures

CONTAINER

The present invention is related to a large sized container for shipping of consignments by rail or road, by sea or by air.

The use of shipping containers for transporting goods is nowadays a well established practice, and several millions of such containers are circulating throughout the world. The advantage of using containers is that a consignment can be despatched without requiring any handling on the way.

As a general rule, shipping containers are made in accordance with the prescriptions of the International Standard Organisation (ISO). They are usually designed to be lifted by their four upper corner components. Shipping containers normally have the following dimensions:

length: 20 ft., 30 ft. and 40 ft.
width: 8 ft.
height: 8 ft. and 8 ft. 6 in.

However, due to the complexity and the flow of international trade, returning the empty containers is both complicated and expensive. Attempts have already been made to reduce the problems associated with the return of empty containers by providing hinges between the side panels and the base: the side panels when released collapse against the base, thus reducing the size of the container. Such containers have been described for instance in the French Pat. Nos. 1,593,377 and 70.44.273, in the French Patent Application No. 76.12.282 and in the British Pat. Nos. 2,039,850 and 1,171,654. These containers however have a major drawback: the hinges are subject to corrosion, more particularly under the effect of salt laden air, when the containers are transported by ship. In such circumstances, these containers can rapidly be put out of service.

A shipping container has also been proposed (U.S. Pat. No. 3,401,814) the side panels of which can be entirely dismounted, but which has the disadvantage of being provided with corner posts to hold the side panels in position when the container is assembled. These corner posts when dismounted increase the height of the collapsed container and furthermore require some special means of attachment on the collapsed container. Also, it is difficult to confer to such containers when assembled and loaded the rigidity required to withstand the stresses to which they are submitted, when for instance, the vehicle on which they are transported accelerates, decelerates or stops.

The purpose of the present invention is to provide a collapsible shipping container, which would not have the above mentioned defects associated with the containers presently known in the art, and which would be of minimal size when collapsed. The shipping container of the present invention is in accordance with the appended claims.

The drawings illustrate a preferred embodiment of the present invention, and also a modification thereof.

DESCRIPTION OF A PREFERRED EMBODIMENT

Figure 1:
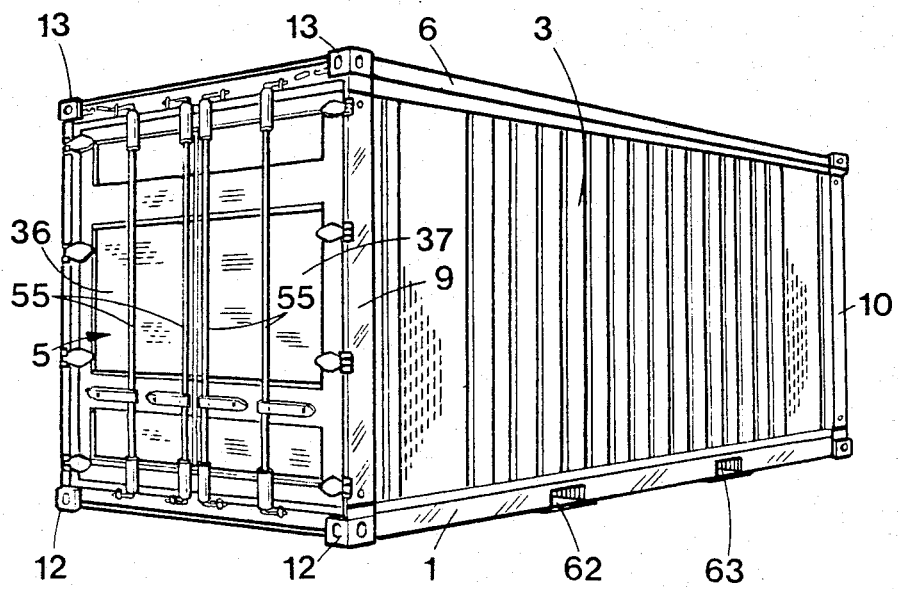
FIG. 1 is a perspective view of the container when assembled.

The container illustrated in FIG. 1 is of standard dimensions. This container comprises a base 1, two side panels 2 and 3, one front panel 4 (not visible on FIG. 1), a back side which opens 5 and a roof 6.

Figure 2:
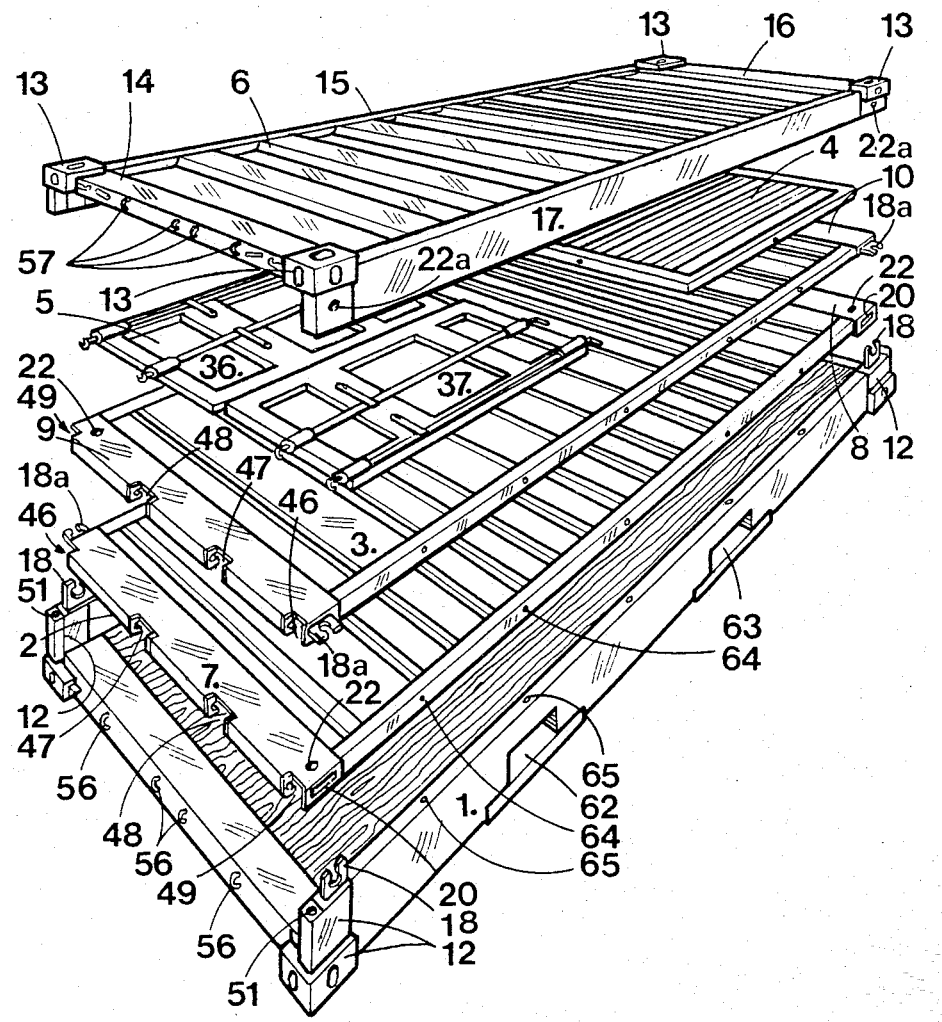
FIG. 2 is a perspective exploded view of the container when dismounted and the components packed together.

FIG. 1 shows the container when assembled and FIG. 2 shows the different parts of the container after dismounting and positioned for their packing; the distance between the components has been exaggerated to make the drawing easier to comprehend.

The panels and the roof are corrugated, by which their rigidity is increased, as would be expected. The side panel 2 is provided at one end with a vertical reinforcement 7, and at the other end with an identical reinforcement 8. In the same way, the side panel 3 is provided with the reinforcements 9 and 10. The front panel 4 is also provided with reinforcements. One of the reinforcements 11 of the front panel can be seen on FIG. 4.

The base 1 comprises four corner components 12 of the same type as normally found on the existing containers.

The roof is also provided with four corner components 13. These corner components are of standard dimensions ($178 \times 151 \times 110$ mm) and they are provided with standard sized bores on all their outer sides. The purpose of these bores is manifold. They provide a grip for the lifting of the container with, for instance, a derrick. They provide a means for fastening two containers together and for fastening a container and a supporting frame (usually with "Twys locks").

The roof 6 is provided on all sides with reinforcements (14, 15, 16 and 17).

Figure 5:
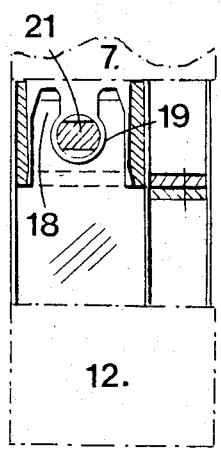
FIG. 5 is a cross-section of the system used for affixing the side panels to the base.

As shown on FIG. 5, each corner component 12 is provided with a device 18 for affixing the side panels to the base. The devices 18 have the general shape of a fork, with the space 19 between the two extensions being circular in shape and of a diameter larger than the distance between the two extensions at their ends.

The lower ends of the reinforcement 7, 8, 9 and 10 are provided with an opening 20 into which the devices 18 are engaged. Each reinforcement is also provided with a locking device 21 of a cylindrical shape with two flattened sides opposite one another. The diameter of the locking device 21 is slightly inferior to the diameter of the circular space 19. Each reinforcement 7–10 is provided with a hole 22 into which a key can be introduced to rotate the locking device 21 by one quarter of a turn. When the locking device 21 is positioned as shown on FIG. 5 the reinforcement is affixed to the base. If the locking device 21 is rotated by one quarter of a turn from the position represented on FIG. 5, it will slip between the two branches of the fork 18 when the side panel is lifted from the base. The side panels are affixed to the base by first positioning the locking device 21, then slipping this device into the circular space 19 and finally rotating the locking device 21 into the position shown on FIG. 5.

The container is provided with safety devices 24 which are fitted inside the container against the panels 2 and 3. The safety device consists in this example of a pivoting bolt which is engaged against one of the flattened surfaces of the locking device 21. As a result, the locking device 21 cannot be rotated any more from the outside with the key. This feature is important, since it prevents anyone from breaking into the container and it also prevents the side panels from becoming accidentally loose. The same system as described above for affixing the side panels to the base is used for affixing the roof to these panels. The upper end of each reinforcement 7, 8, 9 and 10 is provided with a fork 18a identical to 18, while each corner component 13 of the roof is provided with a locking device 21a identical to 21 and which is operated with a key engaged in the hole 22a. The system used for affixing the roof 6 to the panels 2 and 3 is the same as shown on FIG. 5. A safety device 24a, identical to 24 prevents anyone from unlocking the system from outside the container.

The front panel 4 is detachably fastened to the side panels 2, 3, to the base 1 and to the roof 6 as will now be described.

Figure 4:
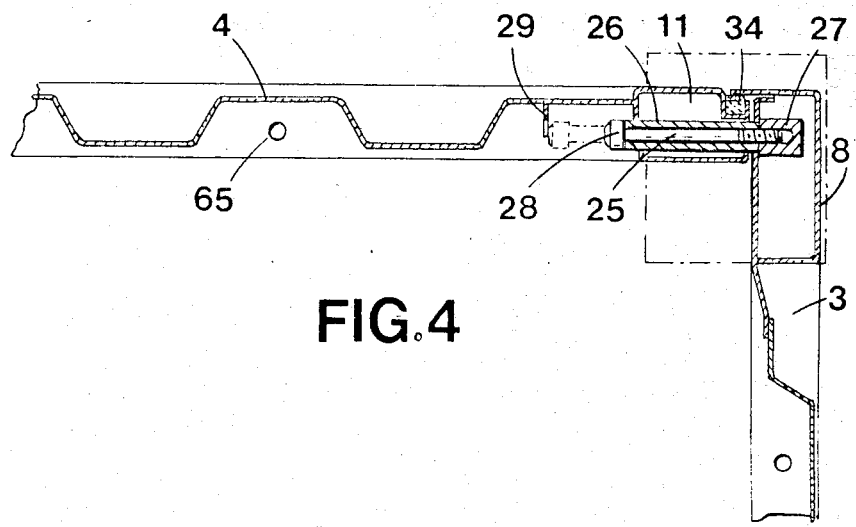
FIG. 4 is a horizontal cross-section of one of the corners of the container in FIG. 1.

FIG. 4 shows the system used for fastening the front panel 4 to the side panel 3. It consists of a bolt 25 inserted into a tube 26 fitted on the reinforcement 11 and engaged into a threaded bore in the component 27 of the reinforcement 8. A component 29 on the front panel 4 prevents the bolt from falling out when unscrewed.

Figure 3:
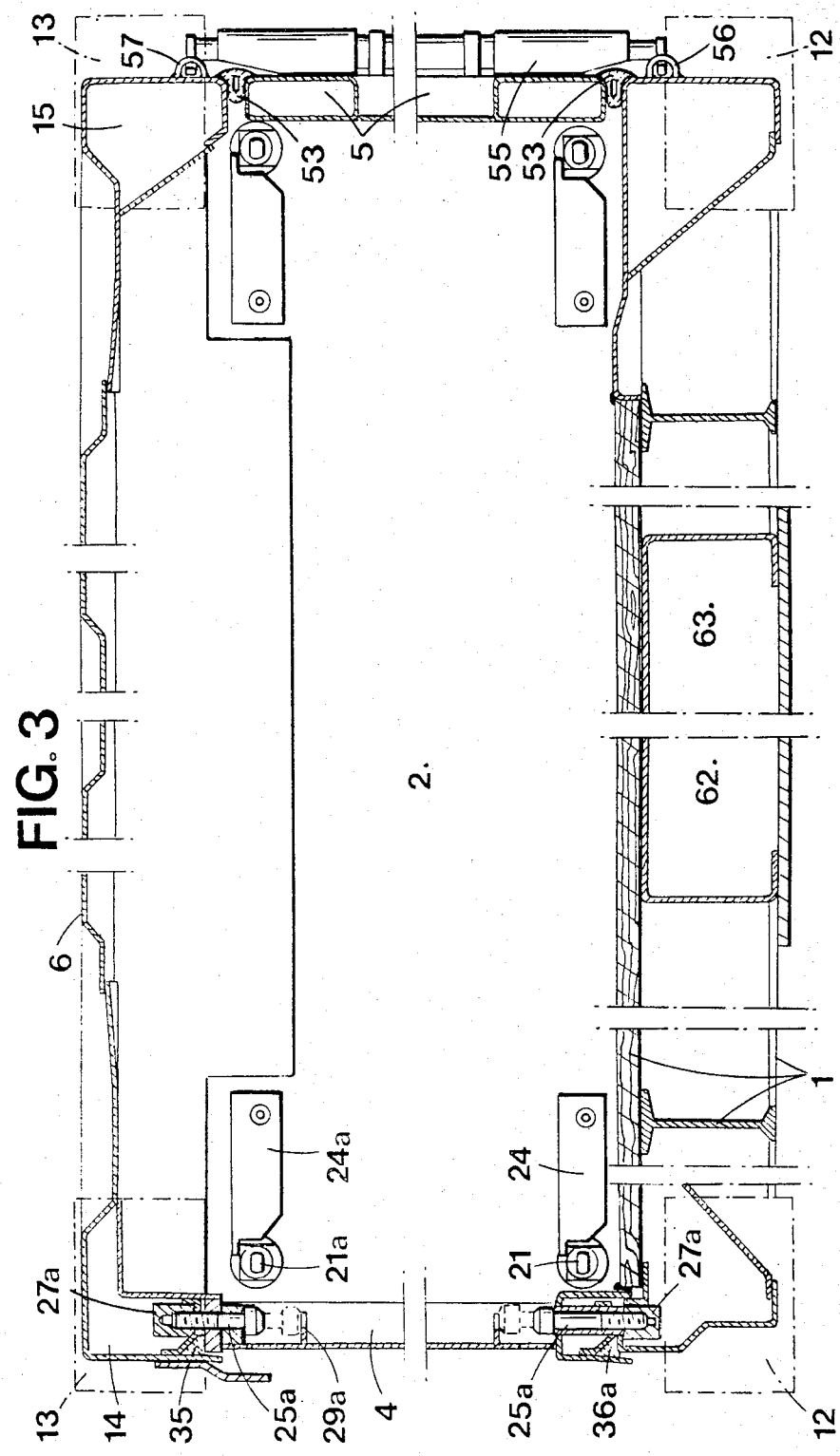
FIG. 3 is a vertical cross-section of the container in FIG. 1.
Figure 10:
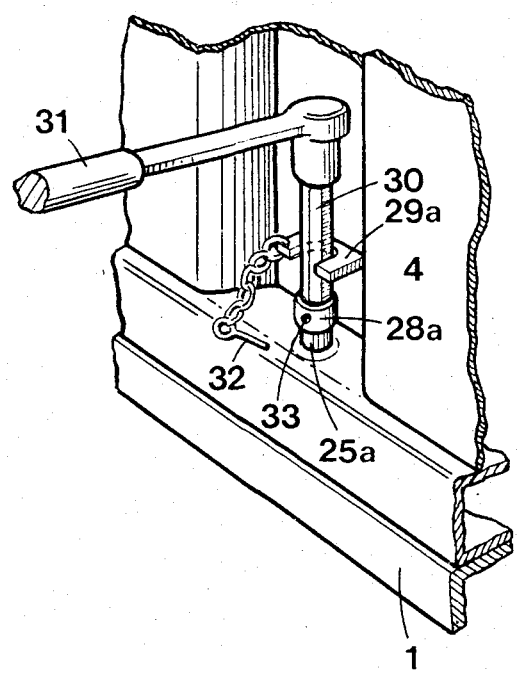
FIG. 10 is a detailed perspective view of the system used to fasten the front panel to the base.

The same system as illustrated on FIG. 4 for fastening the front panel 4 to the side panel 3 is used for fastening the front panel 4 to the base 1 and the roof 6, and is shown on FIGS. 3 and 10.

In both cases, the head 28, 28a of the bolt is provided with a hexagonal socket into which is engaged a key 30 with a handle 31. The component 29, 29a, which is designed to prevent the bolt 25, 25a from falling out is provided with an opening for the key. A pin 32 is attached to the component 29, 29a by a short chain. This pin is engaged in the bore 33 in the head 28, 28a to prevent the bolt from rotating when screwed on. The pin is long enough to be prevented from rotating by the panel 4.

A seal is provided between the side panels 2, 3 and the base 1. This seal is tightened by using the same system as shown on FIG. 10. In this case, the bolts are engaged in the holes 64 in the side panels and 65 in the base (FIG. 2). The side panels are tightened in the same way to the roof 6, and a seal is also provided.

A seal is provided between the front panel and the side panels (34 on FIG. 4), the front panel and the roof (35 on FIG. 3) and the front panel and the base (36a on FIG. 3).

It is to be noted, that the devices for fastening the panel 4 to the other components of the container are all located within the grooves of the corrugated panel 4.

We shall now describe the side of the container which opens. This side consists of two doors, one hinged on the reinforcement 7, the other on the reinforcement 9.

Figure 7:
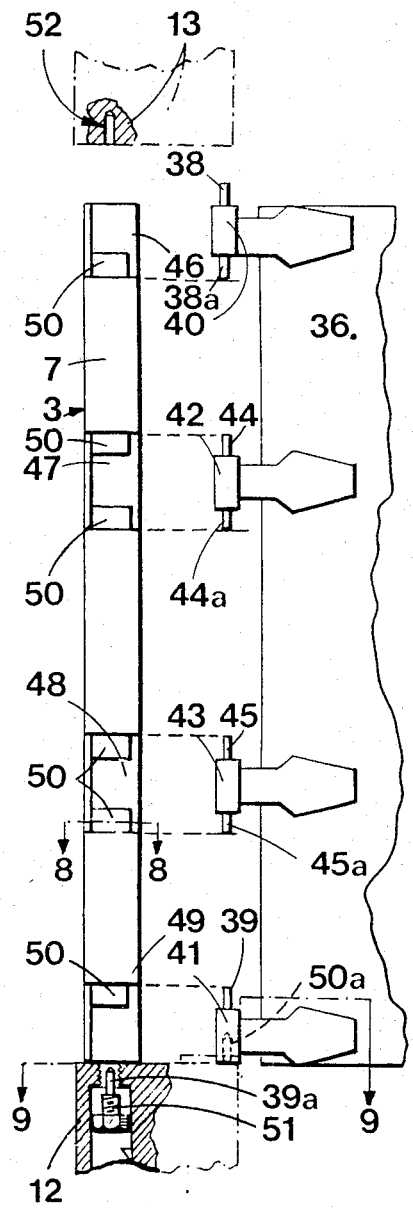
FIG. 7 is a view of a portion of the back side of the container.

FIG. 7 shows a portion of the door 36 with the two upper pins 38 and 38a and the lower pin 39 borne by the components 40 and 41 of the said door. Located between, are two other components 42 and 43 of the same shape which bear the pins 44, 44a, 45 and 45a. All the pins have the same axis.

Figure 8:
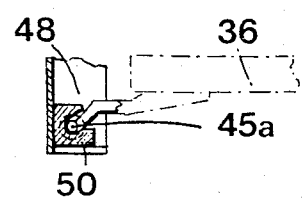
FIG. 8 is cross-section 8—8 of FIG. 7.
Figure 9:
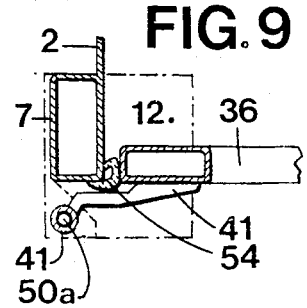
FIG. 9 is cross-section 9—9 of FIG. 7.

The reinforcement 7 has four cavities 46, 47, 48 and 49 which receive the pins 38—38a, 44—44a, 45—45a, 39. Components 50, which are all identical, are welded inside these cavities to provide sockets for the pins. The cavities 46 and 49 have one component 50 each, into which the pins 38a and 39 are respectively engaged. The shape of the component 50 is shown in FIG. 8. The door 36 is hinged on the reinforcement 7 in the following way. Before the roof is assembled, the door is placed as shown on FIG. 7, with the pins facing the components 50 into which they are then engaged. FIG. 8 shows the pin 45a engaged in the socket of the element 50. The diameter of the socket is equal to that of the pin. At this stage, the door is positioned. Then the bolt 51 is screwed into the corner component 12. The extremity of the bolt 51 forms a pin 39a which is engaged into the socket 50a of the component 41, as illustrated on FIG. 7 and 9. The socket 50a is on the same axis as as the other pins. The bolt 51 is set in the corner component 12 in such a manner that it cannot fall out when unscrewed. Finally the roof 6 is lowered on the container, thereby engaging the pin 38 into the socket 52 of the corner component 13. At this stage the door is hinged, and can be rotated by three quarters of a circle from the closed position illustrated on FIG. 1 to a fully open position, where the door is contiguous to the side panel 2. The door 37 is hinged in much the same way. Seals 53 and 54 are provided to ensure that the doors are closed tightly.

The doors are maintained closed and the seals 53, 54 kept tight by means of four bars 55. Two bars are mounted on each door. They have at both ends hooks which engage in the rings 56 of the base 1 and the rings 57 of the roof 6 by rotating the bars around their axes, thus closing tightly the doors. The rings 56 and 57 are shown in FIG. 2.

Before being returned, the container is dismounted and its components packed together as shown on FIG. 2. The side panel 2 is placed on the base 1, the side panel 3 on the side panel 2, etc. The roof 6 comes on the top, with its corner components 13 resting on the corner components 12 of the base. In this position, the devices 18 of the corner components 12 are engaged into corresponding openings in the corner components 13 and locked with the locking device 21a in the same manner as illustrated on FIG. 5. The roof is thus fastened to the base.

As shown on FIG. 2, there is enough room between the roof and the base for storing the two side panels 2 and 3, the front panel 4 and the doors 36 and 37.

The containers, after being dismounted and packed as described above, can be fastened together. This is done as follows.

Figure 6:
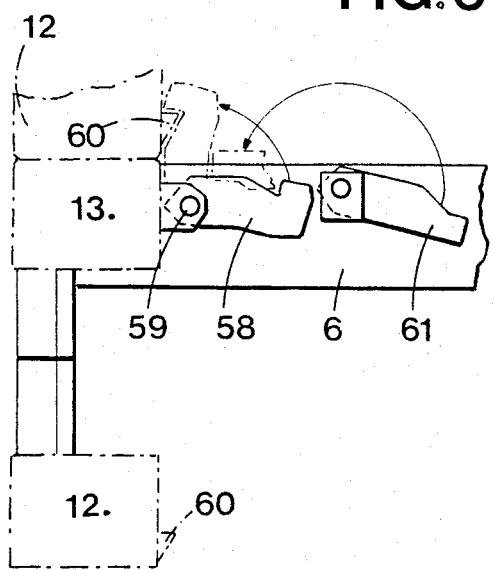
FIG. 6 is a detailed view of the system used for fastening two dismounted containers together: a number of dismounted containers can be thus packed into a single unit.
Figure 11:
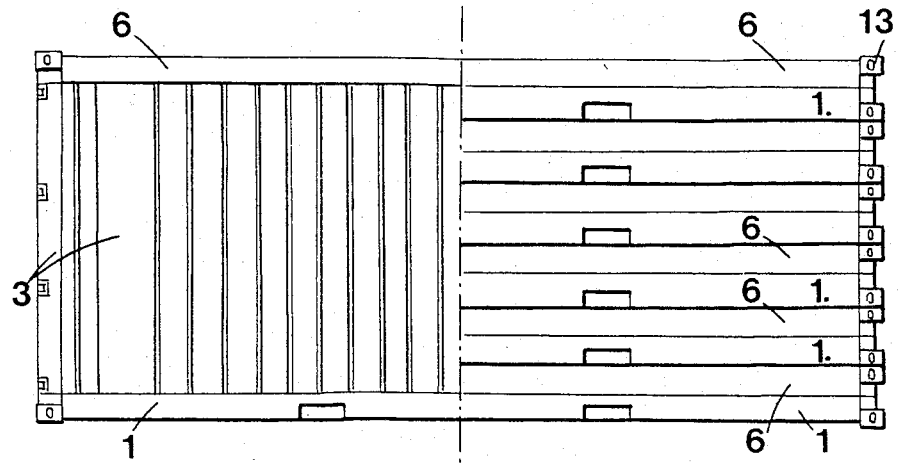
FIG. 11 is a side view of an assembled container on the left, and a side view of six containers dismounted and packed into a single unit on the right; this unit has the same size as the assembled container on the left.

Roof 6 of each container is provided with hooks 58 which can rotate on a pin 50 fixed to the corner component 13. When fastening two dismounted containers together, the hooks are positioned as shown on FIG. 6 by the dotted outline, thus engaging on the wedge-shaped part 60 of the other component 12 of the second container. A safety device 61 is provided to prevent the hook from disengaging itself from the wedge-shaped part 60. FIG. 11 shows six containers dismounted and fastened together as described. They have the same size as one assembled container. Such a unit is easily lifted by the corner components with a crane or with other lifting equipment. Several such units can of course be fastened together if required.

The following advantages should be noted when using the containers according to the present invention.

The only components which are obtained by dismounting a container are the base 1, the two side panels 2 and 3, the front panel 4 and the two doors 36 and 37. No bolt or other means of fastening the components together is released which could be lost. The size of a container when dismounted and with its components packed together amounts to one sixth of the initial size of the container. The expense of returning the empty containers is thus considerably reduced. When a container is assembled, there is no component protruding into the inside of the container which could hinder the loading. The whole area of the floor is at the same level, so that the container can be loaded and unloaded with such equipment as forklifts without inconvenience. Rings can be fitted in hollows in the floor to provide means of immobilizing such consignments as tanks, whether rigid or made of a plastic material. Seals are provided between all the abutting components 1-6. Two openings 62 and 63 are provided in the base for lifting the container with a fork-lift.

We have previously described a system used for fastening the front panel 4 to the side panel 2 and 3, to the roof 6, to the base 1 and also for fastening the side panels 2 and 3 to both the base 1 and the roof 6. This system is illustrated on FIGS. 3, 4 and 10.

Figure 12:
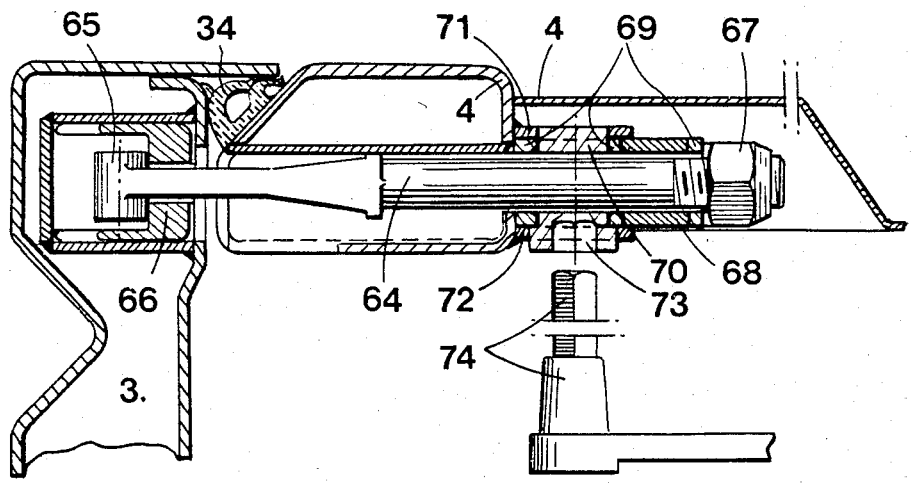
FIGS. 12 and 13 show an articulated fastening device related to a modification of the preferred embodiment of the present invention.
Figure 13:
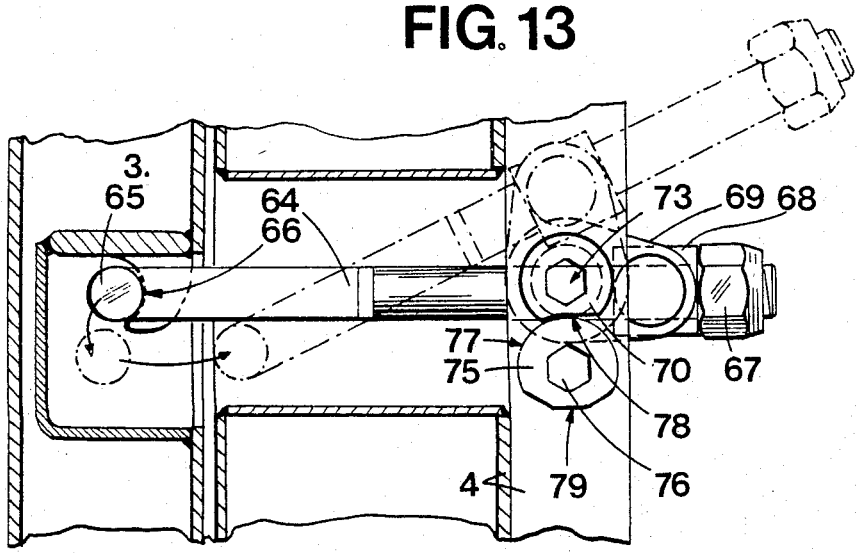

In a modification of the above described embodiment, the bolts have been advantageously replaced by an articulated fastening device, which is illustrated in FIGS. 12 and 13. Only one such device will be described here; we have selected the one used to fasten, as in FIG. 4, the front panel 4 to one side panel 3.

This articulated device comprises a shaft 64, provided at one end with a cylindrical element 65 which is to engage into the seat 66 of the panel 3. The other end of the shaft is threaded, and provided with a nut 67. The shaft 64 can move inside a guiding tube 68. This guiding tube can rotate at the extremity of a lever 69. This lever 69 rotates on a pin 70 which is engaged in the sockets 71 and 72 of the panel 4. The pin 70 is provided with a hexagonal socket 73, by which the lever can be operated from inside the container with a key 74.

In order to fasten the panel 4 and 3 together, the cylindrical element 65 is engaged in the seat 66 and the nut 67 is tightened against the guiding tube 68 as illustrated on FIGS. 12 and 13. In this position the articulated fastening device holds the panel 4 firmly against the panel 3. When the container is dismounted, the lever 69 is rotated by one quarter of a turn with the key 74. The cylindrical element 65 is thus disengaged from the seat 66 as shown by the dotted outline on FIG. 13. Such a movement is only possible because the axis of the pin 70 is located at a short distance from the axis of the guiding tube, as shown on FIG. 13. A safety device 75 is provided to prevent an accidental release of the cylindrical element 65 from the seat 66 once the container has been assembled. The safety device is located close to the pin 70 and is fixed to the panel 4. This safety device is also provided with a hexagonal socket 76 and can be rotated by using the same key 74 as previously. One section 77 of the safety device is cylindrical. When this cylindrical section 77 is engaged into a corresponding incurved section 78 of the pin 70, it prevents the lever from moving. When the safety device is rotated clockwise by half a turn, the flattened section 79 of the safety device comes facing the incurved section 78. The lever is thus freed and can be rotated to the position shown by the dotted outline on FIG. 13. The safety device can be activated again by engaging the cylindrical element 65 into the seat 66 and by rotating the safety device by half a turn.

I claim:

1. A shipping container comprising a base, two side panels, a front panel, a back side which includes at least one door, and a roof, characterized in that
    (a) the preceding components are separable for selective interconnection into an assembled unit, for shipping cargo, and into a collapsed unit, for shipping the container only; and in that the preceding components include:
    (b) abutting means mounted on the sides of each respective panel for making abutting contact in parallel relation with the abutting means on other respective panels when the container is assembled,
    (c) coupling means permanently mounted on the side panel abutting means, the base, and the roof for interconnecting the same, and
    (d) coupling means permanently mounted on the front panel for connecting the front panel to at least one of the base, the side panels, and the roof;
    (e) the at least one door being pivotally hinged on at least one abutting means of a respective one of the side panels, and
    (f) the coupling means for connecting the base and the roof to the side panel abutting means being adapted for directly interconnecting the base and the roof so as to define a space therebetween for containing the side panels, the front panel and the door to form said collapsed unit.

2. A container as in claim 1, in which said back side includes two doors.

3. A container as in claim 2, in which the two doors are each pivotally hinged on a corresponding abutting means of a side panel so as to be rotatable through substantially 270° when opened.

4. A container as in claim 1, further comprising coupling means permanently mounted on the side panels between their respective abutting means for connecting the side panels to the base and the roof.

5. A container as in claim 1 or claim 4, in which
    (a) the inside and outside of said side panels and front panel are corrugated;
    (b) the thickness of the abutting means is less than the depth of the corrugations; and
    (c) the coupling means are located entirely in spaces defined by the corrugations, whereby neither the abutting means nor the coupling means projects from the corrugations either inside or outside the panels.

6. A container as in claim 1, in which
    (a) the base and roof include respective corner components;

(b) the coupling means for interconnecting the side panel abutting means, the base, and the roof includes
   (i) male portions mounted on the corner components and on ends of the side panel abutting means, and
   (ii) female portions mounted on other corner components and on other ends of the side panel abutting means; and
(c) corresponding male and female portions on the corner components and the side panel abutting means are interconnected when the container is assembled.

7. A container as in claim 1, wherein the coupling means for interconnecting the side panel abutting means, the base, and the roof includes
   (a) a locking device for locking and unlocking the coupling means, operated by means disposed outside the container when assembled, and
   (b) a safety device for selectively engaging the locking device so as to prevent unlocking thereof, the safety device being operated by means disposed inside the container when assembled.

8. A container as in claim 1, in which the base and the roof include means for interconnecting a plurality of collapsed units.

9. A container as in claim 1 or claim 8, in which the base and the roof have respective pairs of side members defining a space substantially enclosing the side panels, front panels, and at least one door when the collapsed unit is formed, whereby the height of the collapsed unit is substantially the sum of the height of the base side members and the height of the roof side members.

10. A container as in claim 9, in which the height of the collapsed unit is substantially one-sixth the height of the assembled unit.

11. A container as in claim 1, in which the coupling means include an articulated fastening device.

* * * * *